United States Patent [19]

Sarto

[11] Patent Number: 5,095,581
[45] Date of Patent: Mar. 17, 1992

[54] VARIABLE POSITION DOOR HOLDER AND STOP

[75] Inventor: Julius A. Sarto, San Jose, Calif.
[73] Assignee: J. Sarto Co., San Jose, Calif.
[21] Appl. No.: 714,213
[22] Filed: Jun. 12, 1991
[51] Int. Cl.⁵ .............................. E05F 5/02; F16F 9/48
[52] U.S. Cl. ........................................ 16/82; 188/284; 188/288
[58] Field of Search ...................... 16/82; 188/284, 288

[56] References Cited

U.S. PATENT DOCUMENTS 1,592,912  7/1926  Thompson ............... 16/85
4,838,393  6/1989  Mourray et al. ......... 188/284

FOREIGN PATENT DOCUMENTS 372908  7/1939  Italy ......................... 16/82

Primary Examiner—Robert L. Spruill
Assistant Examiner—Carmine Cuda
Attorney, Agent, or Firm—Kenneth D'Alessandro

[57] ABSTRACT

A mechanism is provided for maintaining an open door in a selected fixed position includes a hydraulic cylinder having first and second ends. One end of a shaft axially disposed in the cylinder, passes through a hydraulic seal at one end of the cylinder. A piston is axially disposed on the shaft near its other end, and includes o-rings for sealing it against the cylinder walls. The piston includes first and second axially-disposed bores. First and second discs, each including an aperture are axially mounted on the shaft in contact with the opposing faces of the piston and are positioned such that the aperture of each is substantially aligned with one of the bores and blocks the other bore. The discs are held against the faces of the piston with a predetermined amount of force.

9 Claims, 4 Drawing Sheets

VARIABLE POSITION DOOR HOLDER AND STOP

BACKGROUND OF THE INVENTION

1. Field of the Invention

The present invention relates to mechanical devices, particularly to hydraulically operated mechanical devices. More particularly, the present invention relates to devices for allowing variable positioning of a door and for holding a door in a preselected open position while still allowing the door to be easily moved or closed.

2. The Prior Art

There are numerous applications in which the maintaining of an open door in a selected fixed position is useful. Examples of such applications in the automotive field include doors on automobiles, vans and trucks, as well as automobile hoods and trunk lids. There are also many other fields where the maintaining of an open door in a selected fixed position would be of use.

There are devices known for holding a door in an open position. Such devices include a wide range of different mechanisms and employ numerous operating principles. There is always room for improvement of such devices.

BRIEF DESCRIPTION OF THE INVENTION

According to a first aspect of the present invention, a mechanism is provided for maintaining an open door in a selected fixed position and includes a hydraulic cylinder having first and second ends. A shaft is axially disposed in the cylinder, and a first end of the shaft passes through a hydraulic seal at one end of the cylinder. A piston is axially disposed on the shaft near its other end, and includes means, such as o-rings, for providing a hydraulic seal between it and the inner wall of the cylinder.

In a presently preferred embodiment, the piston includes first and second pairs of axially-disposed bores. First and second discs, each including a pair of apertures aligned with a pair of the bores, are axially mounted on the shaft at opposing ends of the piston and are in contact with the opposing faces of the piston. The discs are held against the faces of the piston with a predetermined amount of force by means such as springs and act to block the pair of bore outlets with which they are not aligned.

The cylinder is filled with hydraulic fluid and the cylinder and shaft are pivotally mounted to a door and door frame assembly. Motion of the shaft and piston in either direction forces the hydraulic fluid in the cylinder through one of the pairs of axial bores in the piston and against the face of the disc which blocks the bore opening. The amount of resistance to motion of the piston in the cylinder depends on the force with which the spring or other means pushes the disc against the cylinder face.

In order to facilitate closing the door, means are provided to reduce the resistance at a point in the door travel near the closure point. In one embodiment, a member projecting from the cylinder wall through one of the bores in the piston is positioned to push the disc away from the cylinder face at a point in the shaft travel corresponding to the near closure position of the door. In an alternate embodiment, a region of the inner walls of the cylinder is enlarged in diameter or is otherwise configured to provide a bypass for the hydraulic fluid around the cylinder.

BRIEF DESCRIPTION OF THE DRAWINGS

FIGS. 5a and 5b are, respectively a face on view of a split piston for use with the apparatus of the present invention, and a side view of a piston/shaft assembly using a pair of split pistons of FIG. 5a.

DETAILED DESCRIPTION OF A PREFERRED EMBODIMENT

Reference is made to detailed preferred embodiments of the invention, examples of which are illustrated in the accompanying drawings. The invention will be described with reference to the illustrated embodiments. Those of ordinary skill in the art will recognize that there is no intention to limit the invention to the illustrated embodiments. The present invention is intended to cover alternatives, modifications, and equivalents, which may be included within the spirit and scope of the invention as defined by the appended claims.

Figure 1:
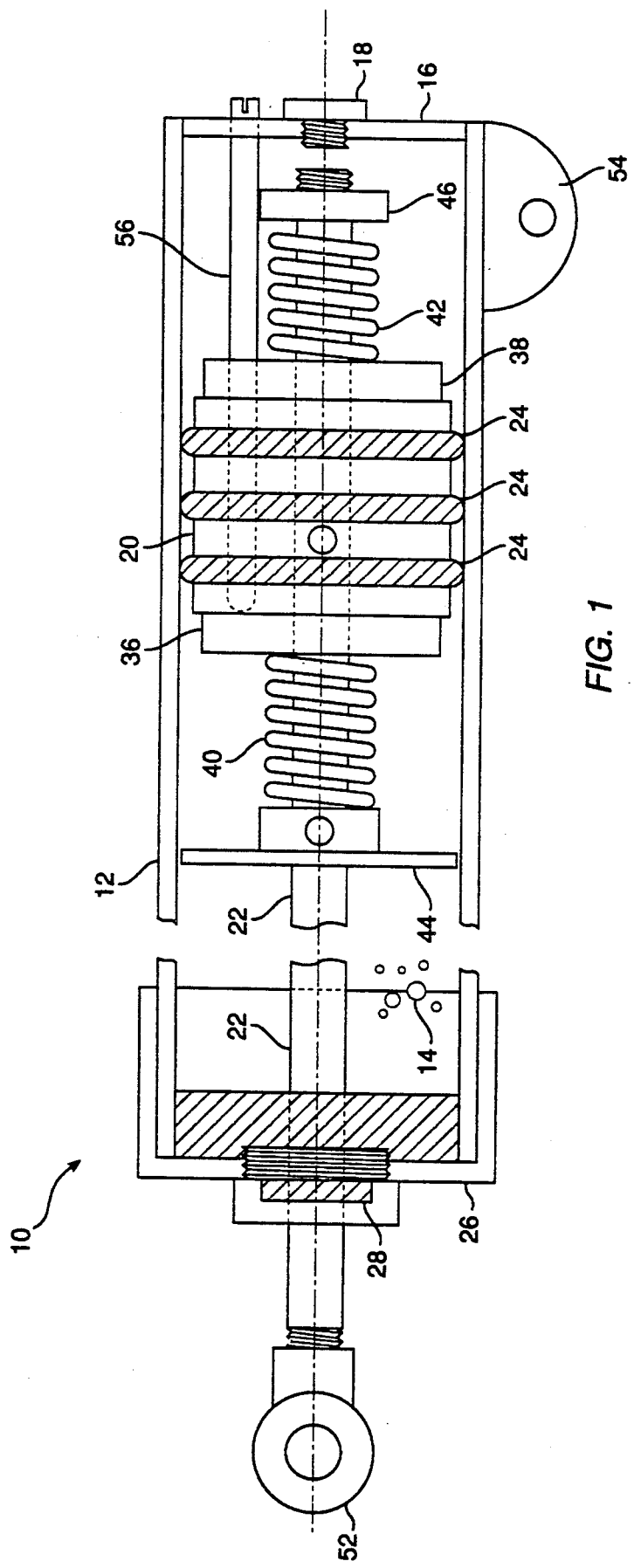
FIG. 1 is a diagram showing a cross sectional view of an apparatus according to a first embodiment of the present invention.

Referring first to FIG. 1, an apparatus 10 according to the present invention is disposed within a cylinder 12. In a presently preferred embodiment of the invention, cylinder 12 may be formed from a metal, such as steel or stainless steel seamless tubing, although those of ordinary skill in the art will recognize that other hydraulic-compatible materials may be used.

Cylinder 12 is filled with a hydraulic fluid 14. In a presently preferred embodiment, hydraulic fluid 14 may be hydraulic fluid type ATF, although other hydraulic fluids may be suitable for use therein. A threaded hole in first end wall 16 of cylinder 12 filled by filler-cap bolt 18 forms a convenient means for filling cylinder 12 with hydraulic fluid 14.

A piston 20, mounted on shaft 22 at a position proximate to one end thereof, is axially disposed within cylinder 12, is moveable along the axis of cylinder 12. O-rings 24 seat piston 20 against the inner walls of cylinder 12 and provide a means to prevent hydraulic fluid from bypassing piston 20 as it moves along its axial path through cylinder 12. The other end of shaft 22 passes through an aperture in second end wall 26 of cylinder 12 provided with hydraulic O-ring seal 28.

Figure 2:
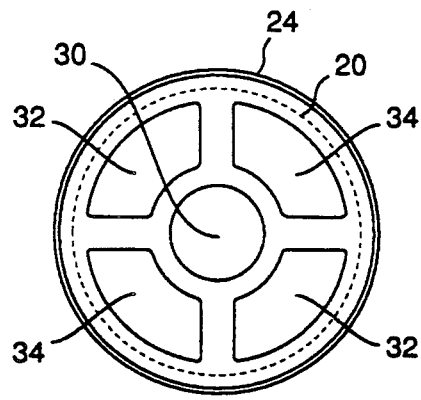
FIG. 2 is an end view of a piston according to a presently preferred embodiment of the invention which may be used in the assembly shown in FIG. 1.

Referring now to FIG. 2, an end view of piston 20 shows it to include an axially disposed central bore 30 through which shaft 22 passes. In addition to central bore 30, a number of axially-oriented bores are provided through piston 20. In the embodiment shown in FIG. 2, piston 20 is shown including a first opposed pair of axially-oriented bores 32 and a second opposed pair of axially-oriented bores 34.

Referring again to FIG. 1, a first disc 36 is mounted on shaft 12 in facing contact with a first end face of piston 20 and a second disc 38 is mounted on shaft 12 in facing contact with a second end face of piston 20. First and second discs 36 and 38 are held against the opposing faces of piston 20 by compression springs 40 and 42, respectively. Compression spring 40 is compressed between first disc 36 and a stop 44, and compression spring 42 is compressed between second disc 38 and a stop 46, which is shown as a bolt threaded onto the first end of shaft 22.

FIG. 3 is a face-on view of first and second discs 36 and 38 showing them to each include a pair of apertures 48 and 50 respectively. First and second discs 36 and 38 are mounted on shaft 22 in orientations such that aperture pair 48 of first disc 36 line up with first opposed bores 32 of piston 20 and aperture pair 50 of second disc 38 line up with second opposed bores 34 of piston 20. As those of ordinary skill in the art will recognize, opposing bores 32 and 34 may be oriented such that a single part may be employed for first and second discs 36 and 38.

The operation of the apparatus of the present invention may be easily comprehended with reference to FIGS. 1-3. Apparatus 10 may be pivotally mounted to a door/door frame assembly by attaching either mount 52 on the end of shaft 22 or mount 54 on the outer wall if cylinder 12 to the door and the other mount to the door frame. As piston 20 travels through cylinder 12 towards first end wall 16, hydraulic fluid 14 is forced through apertures 50 in second disc 38 and opposed bores 34 in piston 20 and against the face of first disc 36. The fluid must counteract the force of spring 40 which pushes first disc 36 against the face of cylinder 20 in order to move to the side of piston 20 proximate to second end wall 26.

As piston 20 travels through cylinder 12 towards second end wall 26, hydraulic fluid 14 is forced through apertures 48 in first disc 36 and opposed bores 32 in piston 20 and against the face of second disc 38. The fluid must counteract the force of spring 42 which pushes second disc 38 against the face of cylinder 20 in order to move to the side of piston 20 proximate to first end wall 16.

Figure 3A:
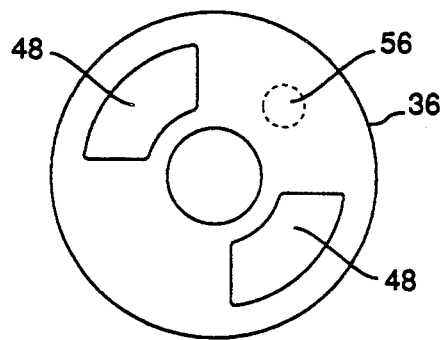
FIGS. 3a and 3b are face views of a pair of discs suitable for use with the embodiment of FIG. 1, shown oriented as they would be mounted on the shaft to communicate with their respective bores in the piston.
Figure 3B:
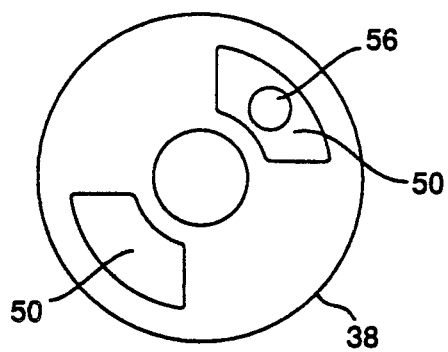

According to another aspect of the present invention, means are provided to facilitate closing of the door by reducing the resistance to motion provided by apparatus 10 when the door is in its near-closed position. Referring again to FIG. 1, final close release member 56 is an axially projecting member extending into cylinder 12 from first end wall 16. As shown in FIGS. 1, 3a, and 3b, final close release member is oriented so that it may pass through one of apertures 50 in second disc 38 and through one of bores 34 as piston 20 moves towards first end wall 16. When the end of final close release member 56 contacts first disc 36 (as shown by the phantom circle in disc 38, further motion of piston 20 towards first end wall 16 will force first disc 36 back against compression spring 40 and away from the end face of piston 20, thus easing the passage of hydraulic fluid 14 to the other end of cylinder 12.

Figure 4:
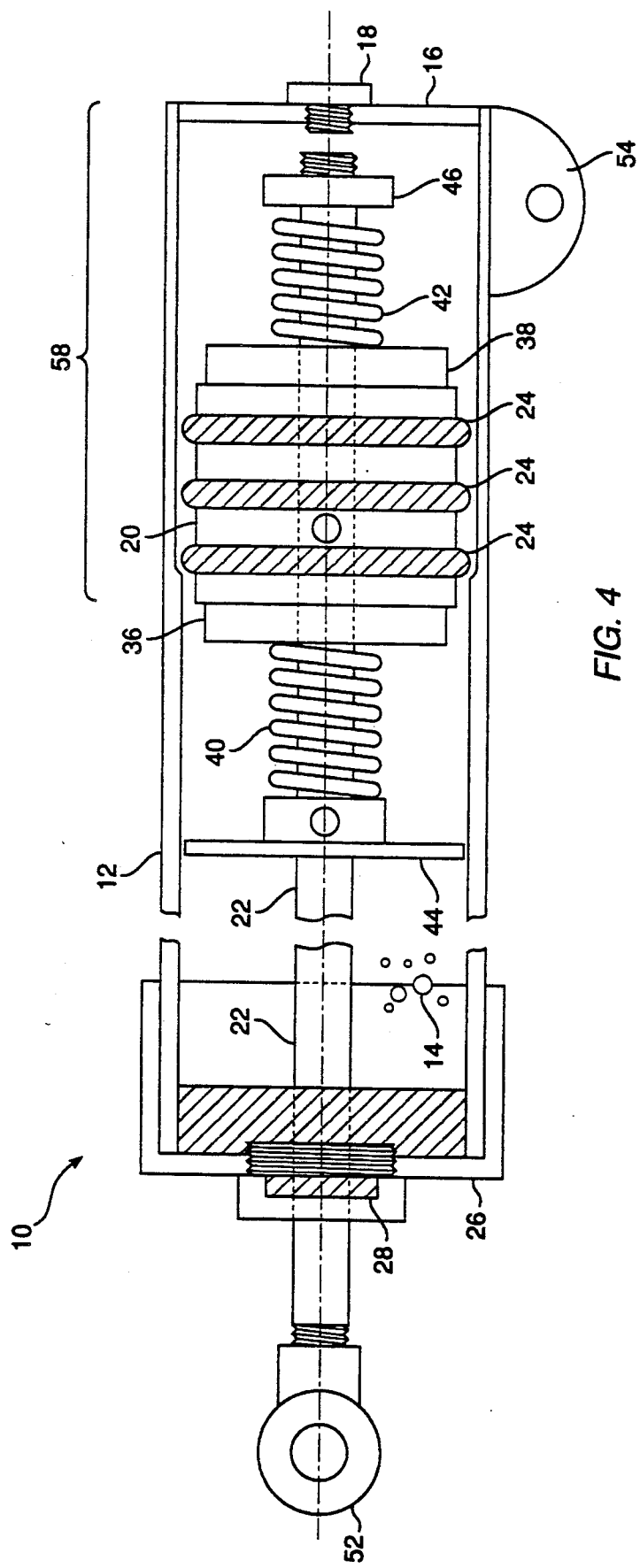
FIG. 4 is a cross sectional diagram of an apparatus according to a second embodiment of the present invention.

An alternate embodiment incorporating this aspect of the invention is illustrated in FIG. 4. In the embodiment of FIG. 4, the configuration of the apparatus is the same as in the other embodiment disclosed with reference to the other figures except that a region 58 of the inner wall of cylinder 12 proximate to first end 16 is provided with an increased inside diameter. The position of region 58 corresponds to the almost-closed position of a door with which the present invention is used and allows the hydraulic fluid 14 to bypass cylinder 12, thus reducing the force exerted by the hydraulic fluid on the piston and allowing the door to move more easily.

Figure 5A:
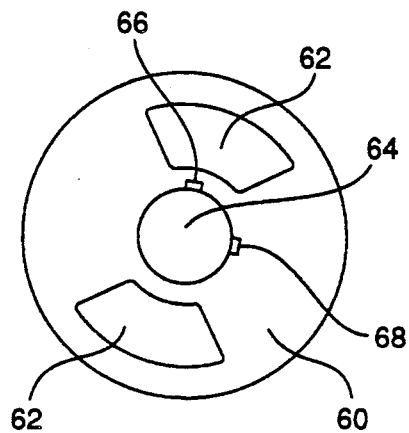
Figure 5B:
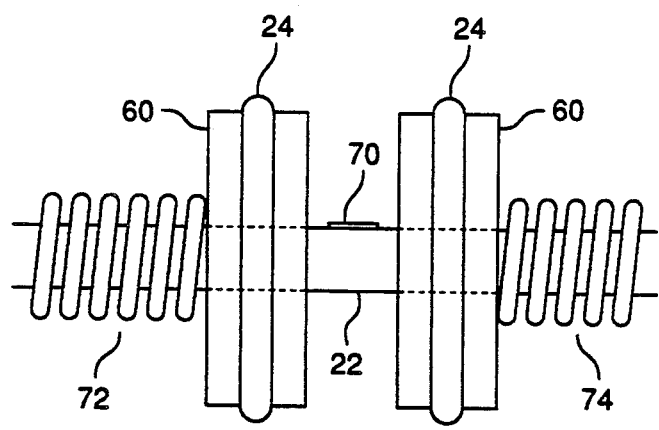

According to an alternate embodiment of the invention, a split piston may be used as illustrated with reference to FIGS. 5a and 5b. FIGS. 5a and 5b are, respectively a face on view of a split piston for use with the apparatus of the present invention, and a side view of a piston/shaft assembly using a pair of split pistons of FIG. 5a.

Referring first to FIG. 5a, a face on view of a split piston 60 shows it to include a pair of opposed axially-disposed bores 62 on either side of hole 64, which receives shaft 22. Two slots 66 and 68, which do not pass completely through piston 60 are radially disposed at different positions (i.e., spaced by 90°) at the edges of hole 64 and may be formed on opposite sides of piston 60.

Two split piston members supplied with o-rings 24 are used in combination with one another and are mounted on shaft 22 so that a different one of the slots on each piston engages an axially-oriented key 70. Split pistons 60 are forced against one another and against key 70 by compression springs 72 and 74. When the pistons are so mounted, the bores 62 of each piston align with the face of the opposing piston in between its bores. From a hydraulic standpoint, this assembly acts in the same manner as the piston and disc combination shown in FIG. 1.

While presently preferred embodiments of the present invention have been disclosed herein, the disclosure will enable those of ordinary skill in the art to realize other embodiments of the invention without departing from the spirit of the invention. It is intended that such embodiments fall within the scope of the present invention, which is to be limited only by the scope of the appended claims.

What is claimed is:

1. Apparatus for holding a door in a selected open position with respect to a door frame to which it is pivotally mounted, including:

a cylinder having first and second ends, said cylinder including means for introducing a hydraulic fluid therein;

a shaft axially disposed in said cylinder, a first end of said shaft passing through a hydraulic seal at said first end of said cylinder;

a piston axially disposed on said shaft proximate to a second end thereof, including means for sealing said piston against the inner walls of said cylinder to substantially prevent the flow of said hydraulic fluid therebetween, said piston also including a first and second axially-disposed bores running therethrough;

first and second discs, each of said discs including an aperture therethrough, each of said apertures having a cross section at least as large as the cross section of said first and second bores through said piston, said first disc axially mounted on said shaft at a first face of said piston located closest to said first end of said shaft and positioned such that its aperture is substantially aligned with said first bore and said second disc axially mounted on said shaft at a second face of said piston located closest to said first end of said shaft and positioned such that its aperture is substantially aligned with said second bore;

means for holding said first and second discs against said first and second faces, respectively, of said piston with a predetermined amount of force such that said first disc blocks said second bore and said second disc blocks said first bore;

release means coupled to said cylinder for pushing said first disc sway from said first face of said piston when said shaft is in a predetermined position corresponding to an almost-closed position of said door;

a first coupling means for mounting said cylinder to said door, a second coupling means for mounting said first end of said shaft to said door frame.

2. The apparatus of claim 1, wherein said release means comprises a member extending axially into said cylinder from said second end thereof, said member aligned with said aperture in said second disc and extending into said cylinder a distance selected to contact said first disc when said shaft is in said predetermined position corresponding to an almost-closed position of said door.

3. The apparats of claim 2 further including means for adjusting the distance over which said member extends into said cylinder.

4. The apparatus of claim 1 wherein said release means is adjustable to change said predetermined position.

5. Apparatus for holding a door in a selected open position with respect to a door frame to which it is pivotally mounted, including:

a cylinder having first and second ends, said cylinder including means for introducing a hydraulic fluid therein;

a shaft axially disposed in said cylinder, a first end of said shaft passing through a hydraulic seal at said first end of said cylinder;

a piston axially disposed on said shaft proximate to a second end thereof, including means for sealing said piston against the inner walls of said cylinder to substantially prevent the flow of said hydraulic fluid therebetween, said piston also including a first pair and a second pair of axially-disposed bores running therethrough;

first and second discs, each of said discs including a pair of apertures therethrough, each of said apertures having a cross section at least as large as the cross sections of said bores through said piston, said first disc axially mounted on said shaft at a first face of said piston located closest to said first end of said shaft and positioned such that its pair of apertures are substantially aligned with said first pair of bores and said second disc axially mounted on said shaft at a second face of said piston located closest to said first end of said shaft and positioned such that its pair of apertures are substantially aligned with said second pair of bores;

means for holding said first and second discs against said first and second faces, respectively, of said piston with a predetermined amount of force such that said first disc blocks said second pair of bores and said second disc blocks said first pair of bores;

release means coupled to said cylinder for pushing said first disc away from said first face of said piston when said shaft is in a predetermined position corresponding to an almost-closed position of said door;

a first coupling means for mounting said cylinder to said door, a second coupling means for mounting said first end of said shaft to said door frame.

6. The apparatus of claim 5 wherein said release means is adjustable to change said predetermined position.

7. The apparatus of claim 5, wherein said release means comprises a member extending axially into said cylinder from said second end thereof, said member aligned with said aperture in said second disc and extending into said cylinder a distance selected to contact said first disc when said shaft is in said predetermined position corresponding to an almost-closed position of said door.

8. The apparatus of claim 7 further including means for adjusting the distance over which said member extends into said cylinder.

9. Apparatus for holding a door in a selected open position with respect to a door frame to which it is pivotally mounted, including:

a cylinder having first and second ends, said cylinder including means for introducing a hydraulic fluid therein;

a shaft axially disposed in said cylinder, a first end of said shaft passing through a hydraulic seal at said first end of said cylinder;

first and second split pistons axially disposed on said shaft proximate to a second end thereof, including means for sealing each of said pistons against the inner walls of said cylinder to substantially prevent the flow of said hydraulic fluid therebetween, each of said first and second split pistons also including a first and second axially-disposed bores running therethrough, said first and second pistons mounted on said shaft in facing relationship and in contact with one another, and oriented on said shaft such that the bores of said first piston are not aligned with the bores of said second split piston;

means for holding opposing faces of said first and second split pistons against one another with a predetermined amount of force such that the face of said first split piston blocks the bores of said second split piston and the face of said second split piston blocks the bores of said first split piston;

means for maintaining the angular orientation of said first and second split pistons on said shaft and for stopping the motion of said first and second pistons at predetermined positions while their faces are in contact;

a first coupling means for mounting said cylinder to said door, a second coupling means for mounting said first end of said shaft to said door frame.

* * * * *